(12) United States Patent
Jagnow et al.

(10) Patent No.: US 10,445,947 B2
(45) Date of Patent: Oct. 15, 2019

(54) METHODS AND APPARATUS FOR INTERACTING WITH A DISTANT OBJECT WITHIN A VIRTUAL REALITY ENVIRONMENT

(71) Applicant: Google Inc., Mountain View, CA (US)

(72) Inventors: Robert Carl Jagnow, Mountain View, CA (US); Robbie Tilton, San Francisco, CA (US); Luca Prasso, Mountain View, CA (US)

(73) Assignee: GOOGLE LLC, Mountain View, CA (US)

(*) Notice: Subject to any disclaimer, the term of this patent is extended or adjusted under 35 U.S.C. 154(b) by 32 days.

(21) Appl. No.: 15/666,561

(22) Filed: Aug. 1, 2017

(65) Prior Publication Data

US 2019/0043265 A1 Feb. 7, 2019

(51) Int. Cl.
| | |
|---|---|
| *G06T 15/00* | (2011.01) |
| *G06T 19/20* | (2011.01) |
| *G06F 3/01* | (2006.01) |
| *G06T 15/08* | (2011.01) |
| *G06T 19/00* | (2011.01) |
| *G06F 3/0481* | (2013.01) |
| *G06F 3/0484* | (2013.01) |

(52) U.S. Cl.
CPC ............ *G06T 19/20* (2013.01); *G06F 3/011* (2013.01); *G06F 3/017* (2013.01); *G06F 3/0484* (2013.01); *G06F 3/04815* (2013.01); *G06T 15/08* (2013.01); *G06T 19/003* (2013.01); *G06T 19/006* (2013.01); *G06T 2215/16* (2013.01); *G06T 2219/2004* (2013.01); *G06T 2219/2016* (2013.01)

(58) Field of Classification Search
CPC ..... G06T 19/003; G06T 19/006; G06F 3/011; G06F 3/04815
See application file for complete search history.

(56) References Cited

U.S. PATENT DOCUMENTS

| | | | |
|---|---|---|---|
| 6,930,715 B1 * | 8/2005 | Mower ............... | G01C 21/165 348/207.99 |
| 2003/0156109 A1 * | 8/2003 | Iwanaga .............. | G06T 15/60 345/419 |

(Continued)

OTHER PUBLICATIONS

International Search Report and Written Opinion for PCT Application PCT/US2018/041010, dated Sep. 20, 2018, 17 pages.

(Continued)

*Primary Examiner* — Charles Tseng
(74) *Attorney, Agent, or Firm* — Brake Hughes Bellermann LLP

(57) ABSTRACT

In at least one general aspect, a method can include determining a position of a user in a virtual reality (VR) environment, determining a position of object in the VR environment, defining a vector between the position of the user and the position of the object, and defining an elongated collision volume along the vector. The elongated collision volume may have a medial portion around at least a portion of the object, a proximal portion disposed proximal to the object, and a distal portion disposed proximal to the object. The proximal portion may have a cross-sectional area less than a cross-sectional area of the distal portion.

18 Claims, 9 Drawing Sheets

(56) References Cited

U.S. PATENT DOCUMENTS

| | | | |
|---|---|---|---|
| 2011/0187706 A1* | 8/2011 | Vesely | G06T 15/00 |
| | | | 345/419 |
| 2011/0199302 A1 | 8/2011 | Tossell et al. | |
| 2012/0147328 A1* | 6/2012 | Yahav | A61B 3/113 |
| | | | 351/210 |
| 2013/0178287 A1* | 7/2013 | Yahav | G02B 27/01 |
| | | | 463/32 |
| 2016/0155260 A1* | 6/2016 | Jenkins | G06T 15/20 |
| | | | 345/419 |
| 2016/0210780 A1* | 7/2016 | Paulovich | G06T 7/73 |
| 2018/0004283 A1* | 1/2018 | Mathey-Owens | |
| | | | G06F 3/04815 |
| 2018/0210627 A1* | 7/2018 | Woo | G06F 3/01 |

OTHER PUBLICATIONS

Mine, et al., "Moving Objects in Space: Exploiting Proprioception in Virtual-Environment Interaction", Computer Graphics Proceedings, Aug. 3-8, 1997, pp. 19-26.

Poupyrev, et al., "The Go-Go Interaction Technique: Non-linear Mapping for Direct Manipulation in VR", ACM Symposium on User Interface Software and Technology (UIST) 1996, Copyright 1997, pp. 79-80.

\* cited by examiner

METHODS AND APPARATUS FOR INTERACTING WITH A DISTANT OBJECT WITHIN A VIRTUAL REALITY ENVIRONMENT

TECHNICAL FIELD

This disclosure relates generally to virtual reality (VR), and, more particularly, to methods and apparatus for interacting with a distant object within a VR environment.

BACKGROUND

In virtual-reality (VR) environments, a user can extend beyond his/her physical limits when interacting (e.g., grabbing, reaching, touching, etc.) with an object. In this case, it may generally be difficult for the user to determine a distance of the object while attempting to interact with the object.

SUMMARY

In one general aspect, a method can include determining a position of a user in a virtual reality (VR) environment, determining a position of object in the VR environment, defining a vector between the position of the user and the position of the object, and defining an elongated collision volume along the vector. The elongated collision volume may have a medial portion around at least a portion of the object, a proximal portion disposed proximal to the object, and a distal portion disposed distal to the object. The proximal portion may have a cross-sectional area less than a cross-sectional area of the distal portion.

Implementations may include one or more of the following features. For example, the method may include determining whether the position of the object is outside of a threshold reach of the user, and defining the elongated collision volume in response to when the object is outside of the threshold reach of the user.

In some implementations, when the position of the user is a first position of the user, the vector being a first vector, the method may include detecting a change in position of the user to a second position of the user, defining a second vector between the second position of the user and the position of the object, and aligning the elongated collision volume along the second vector.

In some implementations, when the position of the object is a first position of the object, the vector being a first vector, the method may include detecting a change in position of the object to a second position of the object, defining a second vector between the second position of the object and the position of the user, and aligning the elongated collision volume along the second vector.

In some implementations, the elongated collision volume may have a trapezoidal shape. The elongated collision volume may have a trapezoidal shape along a first side and a trapezoidal shape along a second side. In some implementations, at least one of the distal portion of the elongated collision volume or the proximal portion of the elongated volume may have a volume greater than a volume of the medial portion of the elongated collision volume. In some implementations, the distal portion of the elongated collision volume may have a volume greater than a volume of the proximal portion of the elongated volume.

In another general aspect, a method can include determining a position of a user in a virtual reality (VR) environment, identifying a collision volume associated with an object, and modifying the collision volume along a direction between the object and the position of the user to define a modified collision volume.

Implementations may include one or more of the following features. For example, the method may include elongating the collision volume associated with the object at least one of toward or away from the position of the user. The modified collision volume of the object may rotate in response to a change in position of the user.

In some implementations, the method may include determining whether the object is outside of a threshold reach of the user. The modified collision volume may be identified when the object is outside of the threshold reach of the user.

In another general aspect, an apparatus may include a sensor configured to determine a position of a user within a virtual reality (VR) environment, and a processor programmed to determine the position of the user in the VR environment, identify a collision volume associated with an object, and modify the collision volume along a direction between the object and the position of the user to defined a modified collision volume.

The details of one or more implementations are set forth in the accompanying drawings and the description below. Other features will be apparent from the description and drawings, and from the claims.

DETAILED DESCRIPTION

Figure 1A:
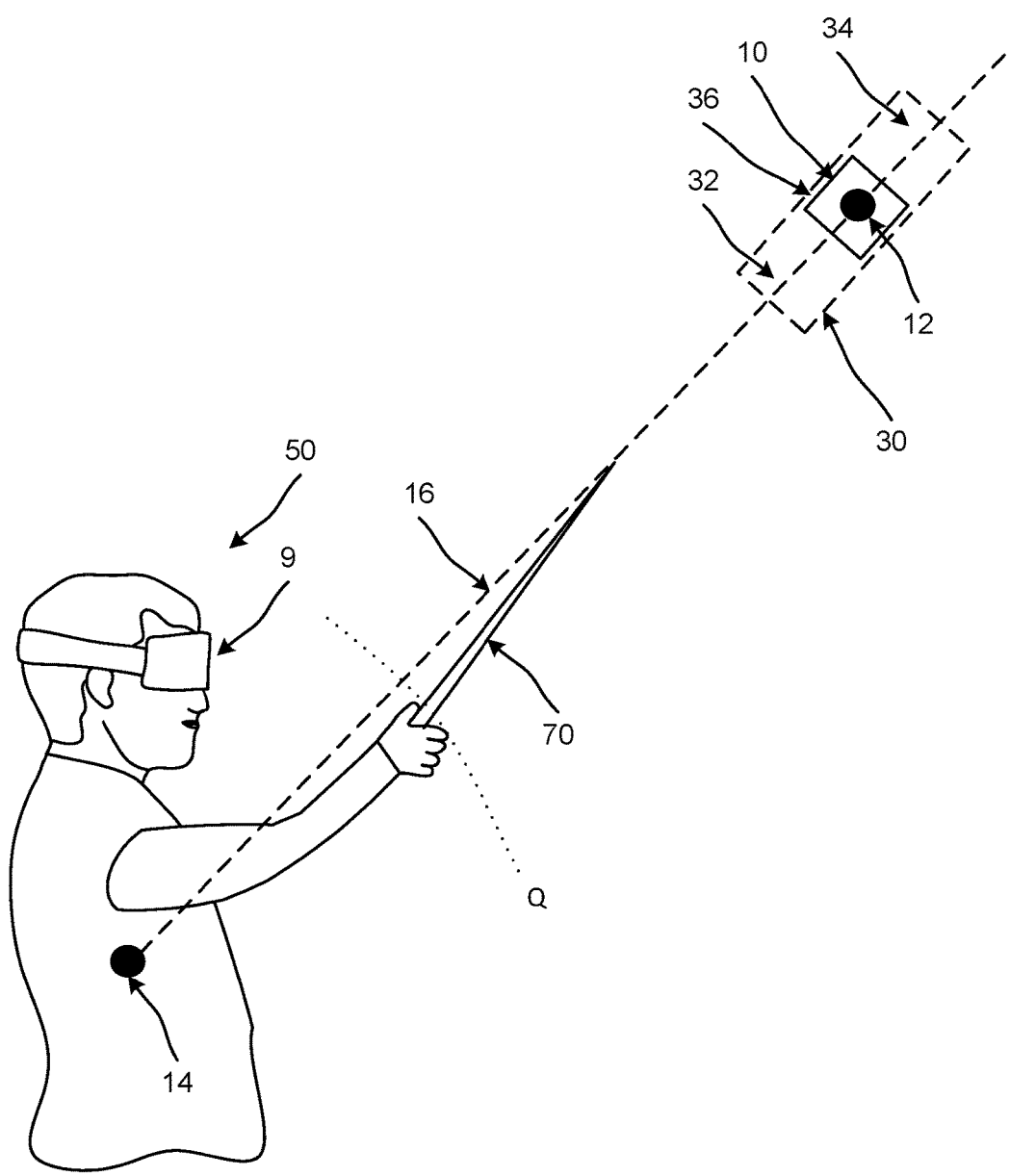
FIG. 1A illustrates a third person view of one example implementation of a system for interacting with an object, in accordance with an example embodiment.

VR content creators may generate objects that are out of reach of a user (also can be an avatar) (e.g., out of reach of an arm of a user, out of reach of a user without modifying the reach of the user). Further, users prefer not to have to walk to every object in a VR environment to be able to reach an object (e.g., reach object using their arm). When a virtual object is outside of the user's reach, the user may have difficulty in judging the distance while interacting with the virtual object. In other words, depth perception may not be correct at longer distances, so users have difficulty in accurately determining how far to reach to interact with the virtual object at a distance in the VR environment. Therefore, a user may under-reach (e.g., may not quite reach the object) or over-reach (e.g., may reach beyond) when interacting with the virtual object. Methods and apparatus that address at least these problems are disclosed herein. The object can be any type of virtual object (e.g., a tool, a graphical object, a user, etc.).

Disclosed example methods and apparatus may identify a collision volume associated with an object. As illustrated in exemplary embodiments, a collision volume may be an area (invisible) at (e.g., around, surrounding) or near the object in the VR environment. The collision volume can be associated with the object to provide the object with more volume and/or with a simpler shape (e.g., a box) with which a user can interact. The additional volume may be easier to calculate, process, etc. when a user is interacting with the object in VR than the actual shape of the object (which can be complex). For example, the collision volume can be relatively larger than the object, and thus, allows the user to easily interact (e.g., grab, touch, contact, hold, reach, etc.) with the object (by interacting with the collision volume). Hence, due to the larger size of the collision volume associated with the object, the user need not be as precise when interacting with the object.

Disclosed example methods and apparatus may further modify the collision volume of the object to define a modified collision volume. The modified collision volume may be defined by elongating the collision volume associated with an object (e.g., an original size of a collision volume around the object) toward and/or away from a position of the user. This modified collision volume provides the object with an extended collision volume (e.g., with even more depth), which permits the user to more easily (and quickly) interact with the object at a distance. Hence, due to a volume (e.g., a size) of the modified collision volume, the user need not be as precise when interacting with the object at a distance.

The modified collusion volume may further move (e.g., rotate) in response to a change in position of the user. When the position of the user moves in relation to the virtual object, the modified collusion volume also moves along a direction (e.g., a line between a location (e.g., a vertex of a center) of the virtual object and a location (e.g., a center of the user)) of a line of sight of the user. This dynamic movement of the modified collusion volume in relation to the user provides a collision volume that is elongated (e.g., always elongated) toward or away from the user (e.g., along a line between the user and the object). Further, the modified collusion volume provides the user an ability to interact with the virtual objects outside of the reach of the user (e.g., outside of arm's reach), thus, providing an enhanced VR experience for the user and the content creator. In this way, a user can naturally navigate substantially, most, generally, etc. all of a VR environment, while interacting with an object that is within reach and/or out of reach.

FIG. 1A illustrates a third person view of a user 50 interacting with an object 10 in a virtual reality (VR) environment, in accordance with an example embodiment.

FIG. 1A illustrates a third person perspective view of the user 50 wearing a head mounted display (HMD) 9 through which a virtual reality environment can be displayed to the user 50. The objects illustrated in FIG. 1A are objects seen by the user 50 within the virtual reality environment through the HMD 9, but are illustrated as seen by the third person view for ease of description. For example, the object 10 shown in FIG. 1A, is seen by the user 50 within the by the user 50 through the HMD 9, but in reality will not be seen by a third person. The other figures within this detailed description are similarly illustrated from a third person perspective for ease of description. In some implementations, the examples described within the detailed description can be applied to multiple objects and/or multiple users.

The object 10 may be at a distance from the user 50 (between position 14 of the user 50 and a position 12 of the object 10). That is, the object 10 is beyond a threshold distance Q (also can be referred to as a reach threshold) of a reach of the user 50 (e.g., outside of the user's normal reach). As shown in FIG. 1A, the threshold distance Q is at an end of (e.g., approximately at an end of) a reach of the user 50. In some implementations, the threshold distance Q can be approximately from the position 14 of the user to an end of a reach of a hand of the user 50 (or avatar of the user 50). For example, the threshold distance Q may be greater than 1 meter, as measured from the user 50.

The object 10 has the position 12 (e.g., a central position) which may be aligned with the position 14 (e.g., a central position) of the user 50. A vector 16 (also can be a line and can be referred to as a line) is defined which is between the position 14 of the user 50 and the position 12 of the object 10.

As illustrated in an example embodiment, the user 50 may use (e.g., employ) an item 70 (e.g., a pole, a stick, etc.) to interact with the object 10. As shown in FIG. 1A, the item 70 allows the user 50 to interact with the object 10 outside of the threshold distance Q of the user 50. In other words, the item 70 is used by the user 50 to interact with the object 10 outside of the typical reach (e.g., threshold distance Q) of the user 50. Although not shown, in some implementations, in the VR environment, the user's 50 arm may be extended (e.g., stretched) to have a reach beyond on the threshold distance Q (e.g., similar to the reach of the item 70).

In order to interact (e.g., grab, touch, contact, hold, reach, etc.) with the object 10, a collision volume 30 is defined at or near the object 10 to assist the user 50 in interacting with the object 10. The collision volume 30 may be a volume at (e.g., around, surrounding) or near the object 10 to provide the object 10 with more depth. The collision volume 30 is shown herein for discussion purposes, but in the virtual environment will not be visible to the user 50. The collision volume 30 may be generally larger than the object 10, and thus, allows the user 50 to easily interact with the object 10. In some implementations, because the collision volume 30 is larger than the object 10, the user 50 may interact with the collision volume 30 without interacting with (e.g., intersecting or coming virtually in contact with) the object 10.

In some implementations, the collision volume 30 may have similar shape as the object 10. For example, if the object 10 is a vase, the collision volume 30 may have a similar shape of a vase, yet the collision volume 30 will be larger than the object 10 (e.g., vase). In some implementations, the collision volume 30 may be a graphical representation of the object 10. For example, the graphical representation may have a shape of at least one of a cube, a rectangular-cube, a sphere, a tetrahedron, or a polyhedron.

In some implementations, the graphical representation of the collision volume 30 should be larger than the object 10.

As noted above, in some implementations, the collision volume 30 may surround (or encompass) the object 10. For example, the collision volume 30 may entirely surround the collision volume 30 so that a wall of the collision volume 30 does not intersect any portion of the object 10. In some implementations, a portion (e.g., a central portion) of the collision volume 30 may intersect (e.g., co-axially aligned in all 3D coordinates) with a portion (e.g., a central portion) of the object 10. In some implementations, the collision volume 30 may not surround the object 10. For example, the collision volume 30 may have a wall that intersects a portion of the object 10. In some implementations, the object 10 (or a portion thereof) may be disposed outside of a wall of the collision volume 30. In some implementations, the collision volume 30 may be off-center from a central portion of the object 10. For example, a center of the collision volume 30 may be in front of the object 10, back of the object 10, or at one side (left-side, right-side, top-side or bottom-side) of a center of the object 10 (e.g., as seen from the user's line of sight.

As shown in FIG. 1A, in an exemplary embodiment, the collision volume 30 may be a modified collision volume. Specifically, the collision volume 30 may be modified from a collision volume associated with (e.g., surrounding) the object 10, when the object 10 is within a reach of the user 50 (e.g., within the threshold distance Q). In some implementations, the collision volume 30 may be modified from a typical collision volume associated with the object 10. An example of a typical collision volume 30 is illustrated, as an example, in FIG. 1B.

An exemplary method to modify the collision volume 30 is to elongate the collision volume 30 towards and/or away from the position 14 of the user 50. In an exemplary embodiment as illustrated, the elongated collision volume 30 may have a shape of a rectangular-cube. Hence, the elongated collision volume 30 permits the user 10 to easily interact with the object 10 due to the elongated collision volume 30 being larger (e.g., longer) in relation to the position of the user 50. More specifically, the elongated collision volume 30 may resolve under-reaching or over-reaching the object 10 when the user 50 attempts to interact with the object 10. Further, this allows the user 50 to interact with the elongated collision volume 30 without actually interacting (e.g., touching, grabbing, contacting, etc.) with the object 10.

The elongated collision volume 30 may have a proximal portion 32 and a distal portion 34. The proximal portion 32 may be closest to the position of the user 50 and the distal portion 34 may be farthest to the position of the user 50. In some implementations, the user 50 may likely interact with the proximal portion 32 of the elongated collision volume since it is the closest portion to the position of the user 50. The elongated collision volume 30 may also have a medial portion 36 (e.g., center of the elongated collision volume) between the proximal portion 32 and the distal portion 34. The medial portion 36 may be around (e.g., co-axially aligned in all 3D coordinates) with the position 12 of the object 10 so that the position 12 of the object 10 is disposed within the medial portion 36 of the collision volume 30. In some implementations, the medial portion 36 may not surround the position 12 of the object 10.

In some implementations, an interface between the medial portion 36 of the collision volume 30 and the proximal portion 32 of the collision volume 30 can be disposed between the position 12 of the object 10 and the position 14 of the user 50. In some implementations, an interface between the medial portion 36 of the collision volume 30 and the proximal portion 32 of the collision volume 30 can be disposed outside of (e.g., outside of a wall of, on a frontside of) the object 10.

In some implementations, the position 12 of the object 10 can be disposed between the position 14 of the user 50 and an interface between the medial portion 36 and distal portion 34 of the collision volume 30. In some implementations, an interface between the medial portion 36 of the collision volume 30 and the distal portion 34 of the collision volume 30 can be disposed outside of (e.g., outside of a wall of, on a backside of) the object 10.

In some implementations, the proximal portion 32 of the collision volume 30 may have a volume smaller than a volume of the medial portion 36 of the of the collision volume 30. In some implementations, the distal portion 34 of the collision volume 30 may have a volume greater than a volume of the medial portion 36 of the of the collision volume 30. More details related to such implementations (e.g., some trapezoidal-shaped implementations) are described in more detail below.

In some implementations, the proximal portion 32 and the distal portion 34 of the collision volume 30 may each have a volume smaller than a volume of the medial portion 36 of the of the collision volume 30. In some implementations, the proximal portion 32 and the distal portion 34 of the collision volume 30 may each have a volume greater than a volume of the medial portion 36 of the of the collision volume 30. In some implementations, the proximal portion 32 and the distal portion 34 of the collision volume 30 may each have a volume that is the same as a volume of the medial portion 36 of the of the collision volume 30.

In some implementations, the proximal portion 32 of the collision volume 30 may have a length (along the vector 16) smaller or longer than a length (along the vector 16) of the medial portion 36 of the of the collision volume 30. In some implementations, the distal portion 34 of the collision volume 30 may have a length (along the vector 16) smaller or longer than a length (along the vector 16) of the medial portion 36 of the of the collision volume 30. In some implementations, the proximal portion 32 and/or the distal portion 34 of the collision volume 30 may have a length (along the vector 16) equal to a length (along the vector 16) of the medial portion 36 of the of the collision volume 30.

In some implementations, the proximal portion 32 and/or the distal portion 34 may be modified (e.g., elongated) along a same direction (e.g., parallel) of the vector 16. In some implementations, the elongated collision volume 30 may be modified (e.g., elongated) in relation to the vector 16 such that the proximal portion 32 and/or the distal portion 34 may extend along a direction non parallel to (e.g., perpendicular to) the vector 16. For example, the proximal portion 32 and/or the distal portion 34 may extend 90 degrees in relation to the vector 16. In some implementations, the proximal portion 32 and/or the distal portion 34 may extend at an angle to the vector 16. For example, the proximal portion 32 and the distal portion 34 may extend at ±30 degrees in relation to the vector 16.

In some implementations, the elongated collision volume 30 may have a shape of a trapezoid. In other words, a volume at the distal portion 34 of the elongated collision volume 30 may be greater than a volume at the proximal portion 32 of the elongated collision volume 30. In some implementations, this shape can ensure that the user 50 interacts with the object 10 during an over-reaching action of the user 50, due to having a greater volume at the distal portion 34. Further, depth perception for an object(s) at a distance may not be as accurate to the user 50, so therefore, the elongated collision volume 30 assists the user 50 to interact with the object 10.

In some implementations, the elongated collision volume 30 (or a portion thereof) (e.g., the medial portion 36, the distal portion 34, the proximal portion 32) may have other shapes, for example, but not limited to, a tetrahedron, a polyhedron, an octahedron, a cone, and an ellipsoid.

Figure 1B:
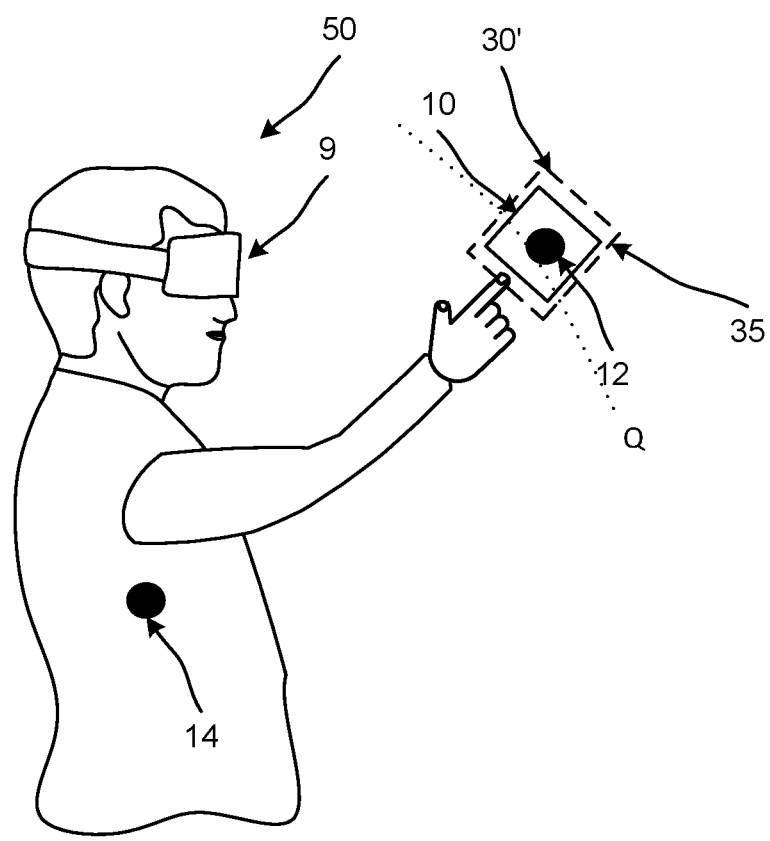
FIG. 1B illustrates a third person view of another example implementation of a system for interacting with an object, in accordance with an example embodiment.

FIG. 1B illustrates another third person view of an example implementation of a system for interacting with an object 10, in accordance with an example embodiment. FIG. 1B is similar to FIG. 1A except that the object 10 is within the threshold distance Q.

Referring to FIG. 1B, the object 10 (or a portion thereof (e.g., a wall of the object 10)) may be at or within the user's 50 normal arm reach (e.g., within the threshold distance Q). For example, the threshold distance Q to interact (e.g., reach) the object 10 may be 1 meter or less. If the user's reach is within 1 meter, the user 50 may be interacting with the object 10. In order to assist the user 50 in interacting with the object 10, a collision volume 30' may be provided at or near the object 10. The exemplary collusion volume 30' as illustrated in FIG. 1B is a non-modified (e.g., non-elongated) version of the collision volume 30 of FIG. 1A.

In some implementations, the collision volume 30' may be larger and may have the same shape as the object 10. For example, the collision volume 30' has a shape of a cube which is the same shape as the object 10, in this case. In some implementations, the collision volume 30' may not have the same shape as the object 10. The collision volume 30' may be a graphical representation (e.g., a sphere, a tetrahedron, a polyhedron, etc.) of the object 10, which is larger than the object 10. In some implementations, this larger collision volume 30' identified near the object 10 permits the user 50 to interact with the object 10 more easily (and quicker). In some implementations, the collision volume 30' may have the same volume as the medial portion 36 of the collision volume 30 shown in, for example, FIG. 1A.

In some implementations, the collision volume 30' may surround the object 10. For example, the collision volume 30' (e.g., a center portion of the collision volume) may surround (e.g., aligned in all 3D coordinates) with a center portion of the object 10.

In some implementations, the collision volume 30' may not surround the center portion of the object 10. In other words, the collision volume 30' may be off-center from the center portion of the object 10. For example, a portion of the collision volume 30' may be in front of the object 10, back of the object 10, or at one side (left-side, right-side, top-side or bottom-side) of the object 10 (e.g., as seen from the user's line of sight).

To accomplish an effective and realistic presentation of interaction of object(s) in the VR environment, the present systems and methods use collision volume to enable to user to interact with the object(s) more easily. For example, consider if the user 50 is on a boat and the user 50 interacts with an object (e.g., fish) that is within the threshold distance (e.g., less than 1 meter), the user 50 can reach their arm into the water to interact (e.g., touch, hold, grab, etc.) with the fish. In such an example, the user 50 may actually interact with a collision volume 30 that is at or near the fish. The collision volume 30 can be generally larger than the fish to provide an invisible volume that may be easily interacted with by the user 50.

In another example, when the same user 50 interacts with another object (e.g., another boat) that is out of the threshold distance (e.g., greater than 1 meter), the user's 50 reach cannot interact with the boat. In this example, the boat that is at a distance (outside the threshold distance) will have a collision volume 30 that may be automatically modified to assist the user 50 to interact with the boat. The modified collision volume may be elongated towards and/or away a position of the user 50 to create even a larger invisible area at or near the boat. The enlarged modified collision volume allows the user 50 to interact with the boat which may be outside of the threshold distance.

In some implementations, the user 50 may be able to interact with one or more objects. For example, the user 50 may interact with a first and/or second object(s) that is/are within the threshold distance (within arm's reach) and a third and/or fourth object(s) that is/are outside of the threshold distance (outside arm's reach). Each object can have a collision volume and/or a modified collision volume.

Figure 2:
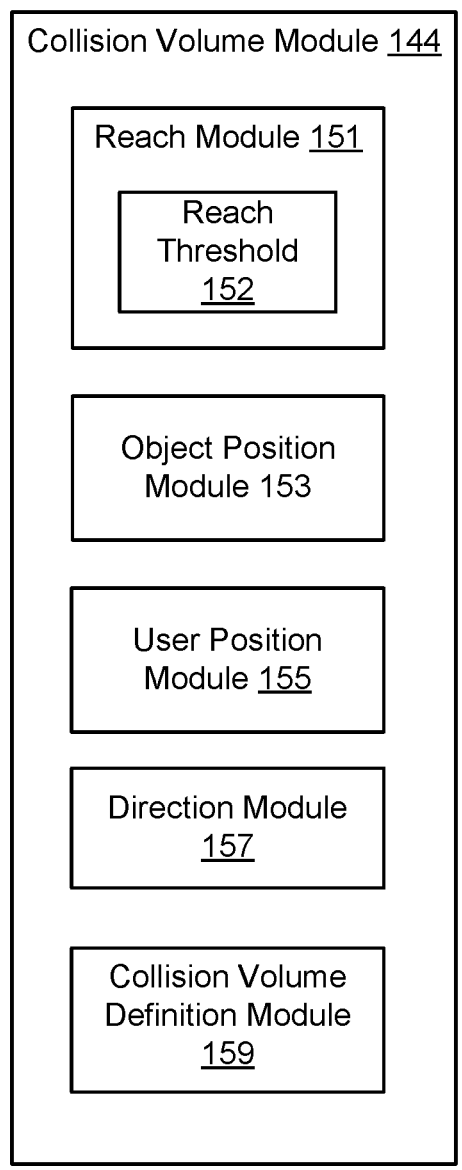
FIG. 2 is a block diagram illustrating a collision volume module in accordance with an example embodiment.
Figure 3:
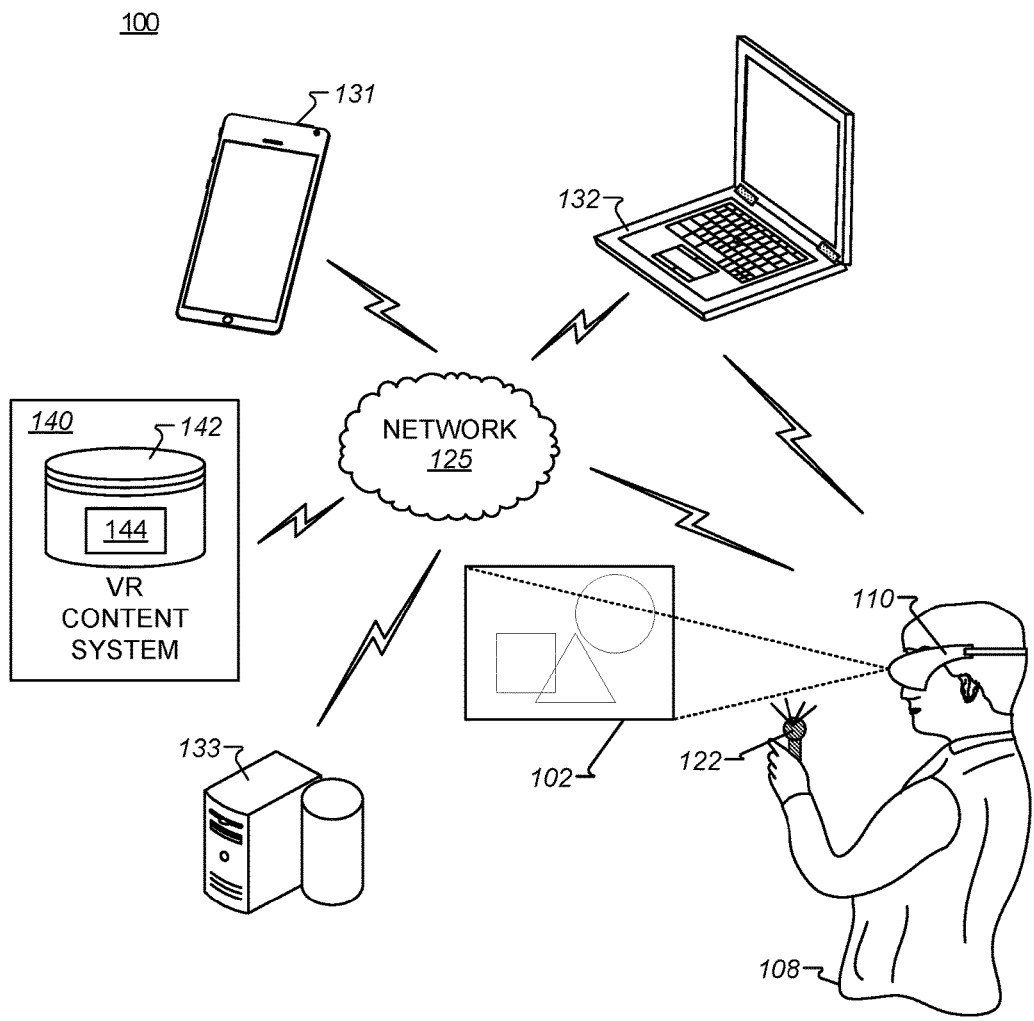
FIG. 3 is a diagram of an example VR system (and third person view) that may be used to determine objects to present in VR environments in accordance with an example embodiment.

FIG. 2 is a block diagram illustrating a collision volume module 144 in accordance with an example embodiment. The collision volume module 144 can generate, modify, and/or execute the collision volume associated with VR objects and/or scenes operated in a VR system 100, as shown in FIG. 3. The collision volume module 144 may include a reach module 151, an object position module 153, a user position module 155, a direction module 157, and a collision volume definition module 159.

The reach module 151 may be configured to determine whether a reach of the user (e.g., user 50) is within a reach threshold 152 (e.g., a threshold distance). For example, if the user's reach is within 1 meter, the user may interact with a collision volume (e.g., collision volume 30) associated with an object (e.g., object 10). If the user's reach is outside the reach threshold (e.g., greater than 1 meter), the collision volume definition module 159 can be configured to modify the collision volume (e.g., elongates) associated with the object such that the user may interact with the modified collision volume.

In some implementations, the reach module 151 can be configured to determine whether the object is within the reach of the user based on a position of the object determined using the object position module 153 and a position of the user determined using the user position module 155. A distance between the position of the user and the position of the object can be compared by the reach module 151 with the reach threshold 152 to determine whether the object is within reach of the user. For example, if the distance is greater than the reach threshold 152, the reach module 151 can determine that the object is outside of the reach of the user.

In some implementations, the object position module 153 may be configured to determine the position of the object in relation to the user. In some implementations, the user position module 155 may be configured to determine the position of the user in relation to the object.

In some implementations, the direction module 157 may be configured to determine the direction of the user with respect to the object, and vice versa. In some implementations, the direction module 157 may be configured to determine the direction of the user with respect to the object, and vice versa, based on the respective positions of the user and object. In some implementations, the direction module 157 can be configured to determine a vector (e.g., a line) between the user and the object.

In some implementations, the collision volume definition module 159 can be configured to define a collision volume associated with the object 10. In some implementations, the collision volume definition module 159 may be configured to define the collision volume based on a size and/or shape of the object. In some implementations, the collision volume definition module 159 may identify the shape of the collision volume as the same shape as the object. In some implementations, the collision volume definition module 159 may identify the shape of the collision volume as a graphical representation of the object. For example, the graphical representation may have a shape of at least one of a cube, a rectangular-cube, a sphere, a tetrahedron, or a polyhedron. In some implementations, the size of the collision volume is generally larger than the object.

In some implementations, the collision volume definition module 159 may be configured to define a modified collision volume. The modified collision volume may be elongated towards and/or away from a position of the user by the collision volume definition module 159. For example, the modified collision volume may have a trapezoidal shape, including a proximal portion and a distal portion. The proximal portion may have a cross-sectional area less than a cross-sectional area of the distal portion.

FIG. 3 illustrates a diagram (which includes a third person view of a user) of an example virtual reality (VR) system 100 for creating and interacting with a three-dimensional (3D) VR environment 102 in accordance with this disclosure. More details related to FIG. 3 are described below.

Figure 4A:
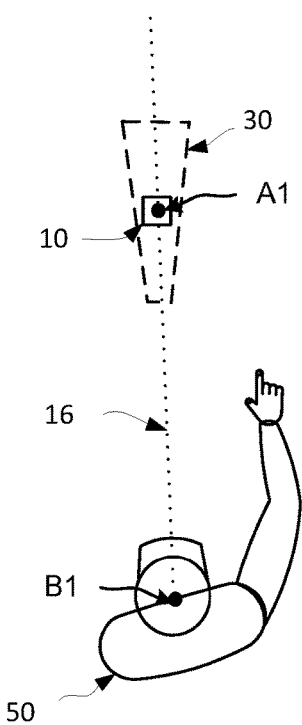
FIGS. 4A and 4B are schematic diagrams of a third person view of a user in relation to a modified collision volume when a user moves in relation to an object, in accordance with an example embodiment.
Figure 4B:
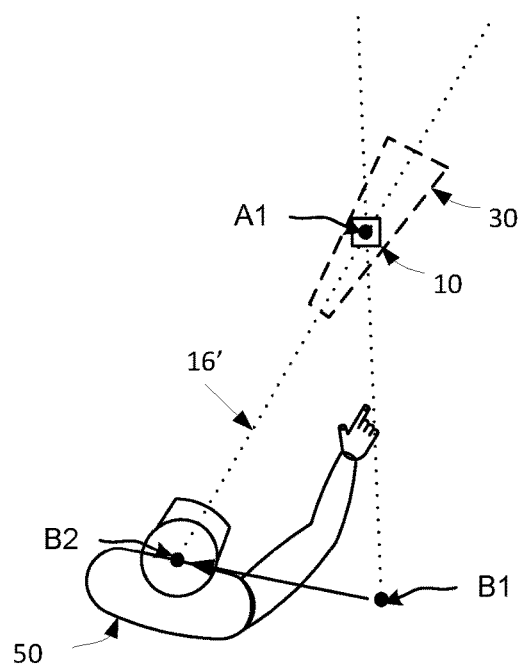

FIGS. 4A and 4B are schematic diagrams of a user 50 in relation to a collision volume 30 (e.g., a modified collision volume) when a user 50 moves in relation to an object 10, in accordance with an example embodiment. FIG. 4A illustrates the user 50 in a first position in relation to the object 10, defining a first vector 16. The first vector 16 may be aligned between a position B1 of the user and a position A1 of the object 10. FIG. 4B illustrates the user 50 in a second position B2 (moved from position B1) in relation to the object 10, defining a second vector 16'. The second vector 16' may be aligned between a position of the user B2 and a position A1 of the object 10.

As shown in FIG. 4B, when the user 50 moves position from B1 to B2, the modified collision volume 30 associated with the object 10 also moves (e.g., rotates) such that the second vector 16' is aligned between the position of the user B2 and the position A1 of the object 10. The collision volume 30 is moved to be aligned with the second vector 16'. The movement of the modified collision volume 30 is dynamic, which means that the modified collision volume 30 moves when the position of the user 50 changes. As illustrated in this exemplary implementation, the second vector may be, for example, 30 degrees in relation to the first vector. In some other implementations, the second vector may be defined between 0 and 360 degrees in relation to the first vector.

Although FIGS. 4A and 4B are illustrated in a two-dimensional (2D) example, the principles described herein can be applied in three-dimensions with movement along X,Y, and Z axis. In some implementations, a yaw, pitch, and/or roll of the object 10 and/or the user 50 may change. In such implementations, the collision volume 30 can remain aligned along the vectors 16, 16' even with such changes.

Figure 5A:
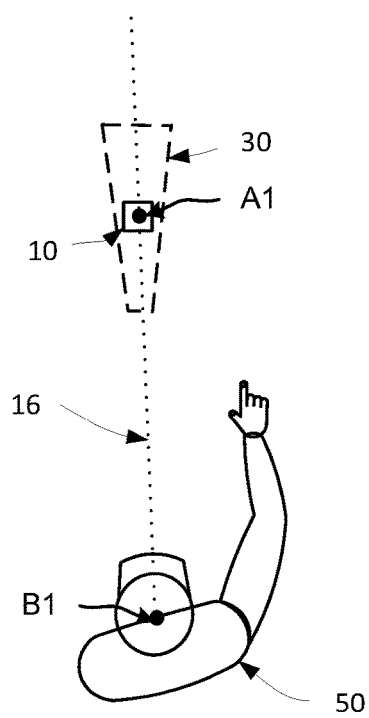
FIGS. 5A and 5B are schematic diagrams of a third person view of a user in relation to a modified collision volume when an object moves in relation to a user, in accordance with an example embodiment.
Figure 5B:
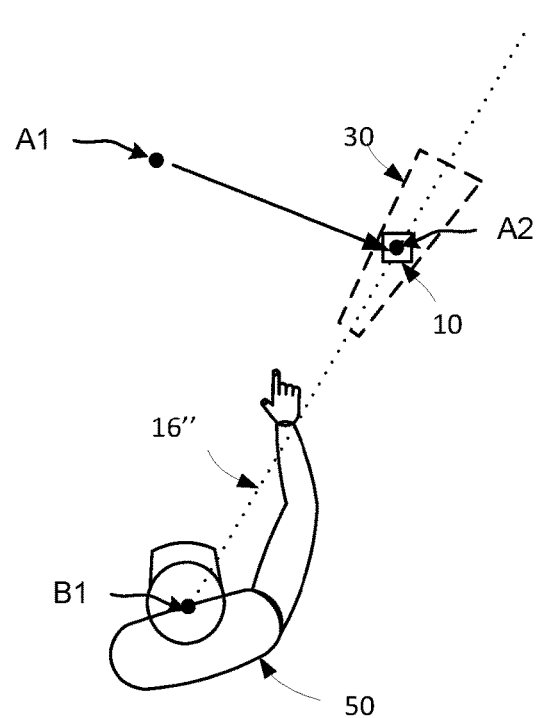

FIGS. 5A and 5B are schematic diagrams of a user 50 in relation to a modified collision volume 30 when an object 10 moves (from A1 to A2) in relation to the user 50, in accordance with another example embodiment. FIG. 5A illustrates the object 10 in a first position in relation to the user 50, defining a first vector 16. The first vector 16 may be aligned between a position B1 of the user and a position A1 of the object 10. FIG. 5B illustrates the object 10 in a second position A2 in relation to the user 50, defining a second vector 16". The second vector 16" may be aligned between a position B1 of the user and a position A2 of the object 10.

As shown in FIG. 5B, when the object 10 moves position from A1 to A2, the modified collision volume 30 associated with the object 10 moves such that the second vector 16" is aligned between the second position A2 of the object 10 and the position of the user 50 (e.g., the position of the user B1 and the position A2 of the object 10 are aligned). The collision volume 30 is moved to be aligned with the second vector 16". The movement of the modified collision volume 30 is dynamic, which means that the modified collision volume 30 moves when the position of the object 10 moves.

Although FIGS. 5A and 5B are illustrated in a two-dimensional (2D) example, the principles described herein can be applied in three-dimensions with movement along X,Y, and Z axis. In some implementations, a yaw, pitch, and/or roll of the object 10 and/or the user 50 may change. In such implementations, the collision volume 30 can remain aligned along the vectors 16, 16" even with such changes.

Figure 6A:
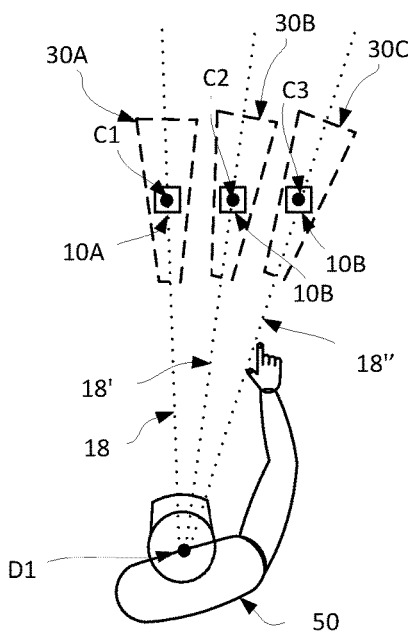
FIGS. 6A and 6B are schematic diagrams of a third person view of a user in relation to multiple modified collision volumes when a user moves in relation to objects, in accordance with an example embodiment.
Figure 6B:
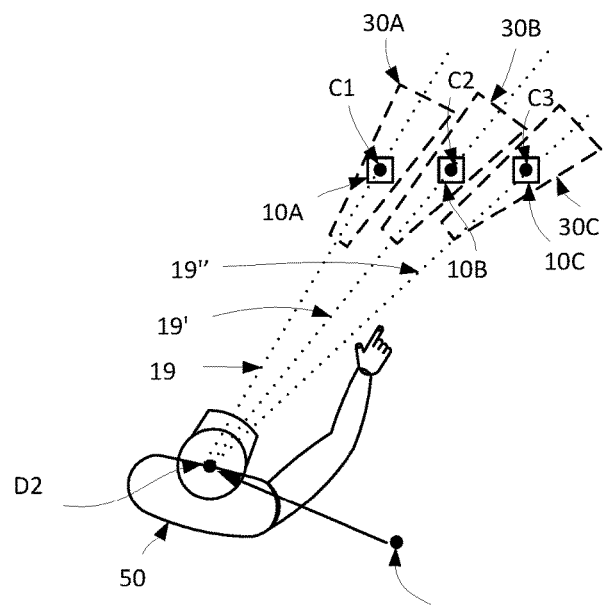

FIGS. 6A and 6B are schematic diagrams of a user 50 in relation to multiple modified collision volumes 30 (e.g., 30A through 30C) when the user moves in relation to objects 10 (e.g., 10A through 10C), in accordance with another example embodiment. The objects 10 are illustrated as being aligned along a plane approximately the same distance from the user 50 for simplicity in description. In some implementations, the object 10 may be different sizes, different distances from the user 50, and/or so forth.

FIG. 6A illustrates the user 50 in a first position D1 in relation to multiple objects 10 (in this case three objects), defining first vectors 18, 18', 18", respectively. The vectors 18, 18', 18" may be aligned between a position D1 of the user 50 and respective positions C1, C2, C3 of the objects 10. FIG. 6B illustrates the user 50 in a second position D2 in relation to the multiple objects 10, defining vectors 19, 19', 19", respectively. The vectors 19, 19', 19" may be aligned between a position of the user D2 and positions C1, C2, C3, respectively, of the multiple objects 10.

In these implementations, the vectors 18, 18', and 18" are non-parallel with one another, and even with movement of the position of the user 50, the vectors 19, 19', and 19" are non-parallel with one another. Accordingly, the collision volumes 30A through 30C are also aligned non-parallel with one another. The trapezoidal shapes of the collision volumes 30A through 30C reduces (e.g., prevents, minimizes) overlap between the collision volumes 30A through 30C.

As shown in FIG. 6B, when the user 50 moves position from D1 to D2, the modified collision volumes 30 associated with the respective objects 10 also move such that modified collision volumes 30 are aligned with the vectors 19, 19', 19", which are aligned between the position of the user D2 and the positions C1, C2, C3, respectively of the objects 10. The movement of the modified collision volumes 30 are dynamic, which means that each of the modified collision volumes 30 move when the position of the user 50

Figure 6C:
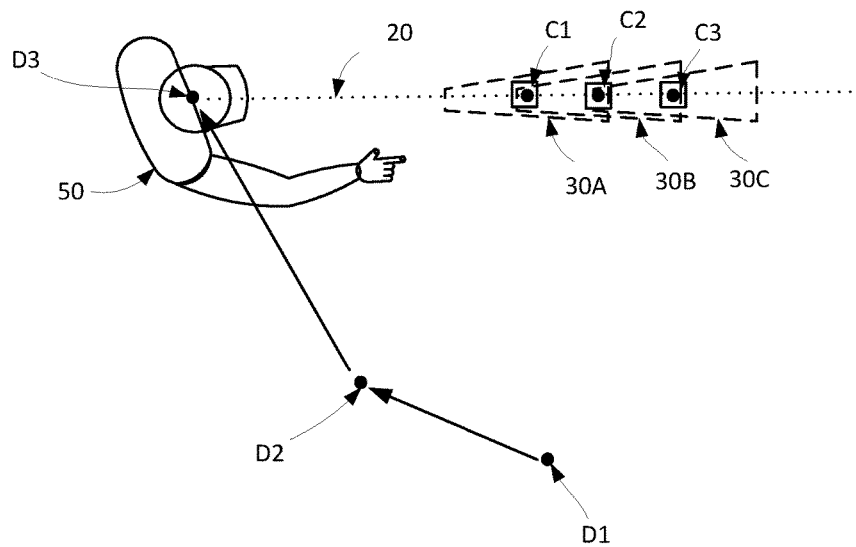
FIG. 6C is a schematic diagram of a third person view of a user in relation to multiple overlapping modified collision volumes, in accordance with an example embodiment.

FIG. 6C is a schematic diagram of the user 50 in relation to multiple, overlapping modified collision volumes 30, in accordance with another example embodiment.

As shown in FIG. 6C, when the user 50 moves position from D2 to D3, the modified collision volumes 30 associated with the objects 10 move such that the respective vectors 20 all align along a same vector (e.g., between a position of the user D3 and positions C1, C2, C3 of the objects 10). This also causes the modified collision volumes 30 to overlap. In some implementations, this overlapping configuration can permit the user 50 to interact with multiple objects 10 simultaneously.

In some implementations, because the modified collision volumes 30 are overlapping to resolve this issue, the system can be configured to employ an algorithm to determine an order of selecting the object. In one implementation, the system may select the object that is closest to the user. In this case, the system may determine that the user 50 is targeting interaction with the object 10 containing position C1, which is closest to the user 50. In some implementations, the system may be configured to select the object with a position (e.g., a center position) that is closest to a selection point (e.g., a hand, a selection device) of the user 50. For example, if the user 50 attempts to reach for the farthest object (e.g., object with position C3) and positions a virtual selection device (e.g., a hand, a wand) relatively close to the farthest object (and closer to a position of the farthest object than the other objects), the system may be configured to select the farthest object 10 for interaction.

In some implementations, the positions C1, C2, C3 of the objects 10 may not be on a same vector as the position of the user 50. For example, while position C2 of the object 10 may be on the same vector as the position of the user 50, position C1 of the object 10 may be above the vector of the position of the user 50 and position C3 of the object 10 may be below the vector of the position of the user 50, while the respective collision volumes are overlapping. In this case, as similarly discussed above, the system may select the modified collision volume which is closest to the user 50 or may select the modified collision volume whose position is closest to a selection point of the user 50.

Although exemplary implementations described herein illustrate the user 50 interacting with three objects 10, the user 50 may interact with more or less than three objects. Further, exemplary implementations illustrate the collision volume 30 of a trapezoidal shape; however other shapes may be employed (e.g., a cube, a rectangular-cube, a sphere, a tetrahedron, a polyhedron, etc.), Although FIGS. 6A through 6C are illustrated in a two-dimensional (2D) example, the principles described herein can be applied in three-dimensions with movement along X,Y, and Z axis. In some implementations, a yaw, pitch, and/or roll of the object 10 and/or the user 50 may change. In such implementations, the collision volumes 30A through 30C can remain aligned along the various vectors 18 even with such changes.

Figure 7:
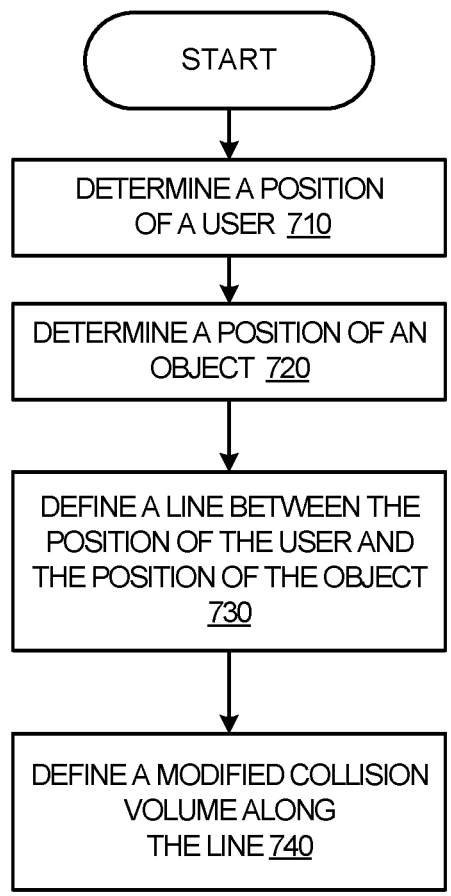
FIG. 7 depicts a flow diagram relating to identifying a collision volume in a virtual reality environment in accordance to an example embodiment.

FIG. 7 illustrates an example method 700 that may be performed to determine user's interaction with an object within a VR environment as disclosed herein. The example method 700 of FIG. 7 begins with determining a position of a user (block 710), determining a position of an object (block 720), defining a line (e.g., a vector) between the position of the user and the position of the object (block 730), and defining a modified (e.g., elongated) collision volume along the line (block 740).

At block 710, the position of the user is determined in relation to the object. At block 720, the position of the object is determined in relation to the user.

When the user or the object moves, a line is defined between a position of the object is aligned to a position of the user At block 740, if the object is outside of a threshold reach of the user, the collision volume (e.g., elongates) associated with the object is modified such that the user may interact with the modified collision volume. The modified collision volume may be elongated along the line where the elongated collision volume has a medial portion around at least a portion of the object. The elongated collision volume may have a proximal portion disposed proximal to the object and a distal portion disposed distal to the object. In some implementations, the proximal portion may have a cross-sectional area that is less than a cross-sectional area of the distal portion. If the object is within the threshold reach of the user, the collision volume may not be modified.

The example method 700 of FIG. 7, or other methods disclosed herein, may, for example, be implemented as machine-readable instructions carried out by one or more processors to control or operate the example display assemblies disclosed herein. A processor, a controller and/or any other suitable processing device may be used, configured and/or programmed to execute and/or carry out the example methods disclosed herein. For instance, the example method 700 of FIG. 7, or other methods disclosed herein may be embodied in program code and/or machine-readable instructions stored on a tangible and/or non-transitory computer-readable medium accessible by a processor, a computer and/or other machine having a processor, such as that discussed below in connection with FIG. 3. Machine-readable instructions can include, for example, instructions that cause a processor, a computer and/or a machine having a processor to perform one or more particular processes. Many other methods of implementing the example method 700 of FIG. 7, or other methods disclosed herein may be employed. For example, the order of execution may be changed, and/or one or more of the blocks and/or interactions described may be changed, eliminated, sub-divided, or combined. Additionally, any of the entire example method 700 of FIG. 7, or other methods disclosed herein may be carried out sequentially and/or carried out in parallel by, for example, separate processing threads, processors, devices, discrete logic, circuits, etc.

FIG. 3 illustrates a diagram of an example virtual reality (VR) system 100 for creating and interacting with a three-dimensional (3D) VR environment 102 in accordance with the teachings of this disclosure is shown. In general, the system 100 may provide the VR environment 102, and VR content that enable a person (e.g., a user, a wearer, etc.) to access, view, use and/or interact with the VR environment 102. The VR system 100 can provide the user with options for accessing the content, applications, virtual objects, real objects, and VR controls. The example VR system 100 of FIG. 1 may include a user 108 wearing a head-mounted display (HMD) 110, and having a handheld controller 122. The example VR environment 102 shown in FIG. 1 is a representation of the images being displayed for the user inside their HMD 110.

The example VR system 100 may include any number of computing and/or electronic devices that can exchange data over a network 125. The devices may represent clients or servers, and can communicate via the network 125 or any other additional and/or alternative network(s). Example client devices include, but are not limited to, the HMD 110, the handheld controller 112, a mobile device 131 (e.g., a smartphone, a personal digital assistant, a portable media player, etc.), a laptop or netbook 132, a desktop computer 133, an electronic tablet (not shown), a camera (not shown), a gaming device (not shown), and any other electronic or computing devices that can communicate using the network 125 or other network(s) with other computing or electronic devices or systems, or that may be used to access VR content or operate within a VR environment. The devices 110, 112, and 131-133 may represent client or server devices. The devices 110, 112, and 131-133 can execute a client operating system, and one or more client applications that can access, render, provide, or display VR content on a display device included in or in conjunction with each respective device 110, 112 and 131-133.

Figure 8:
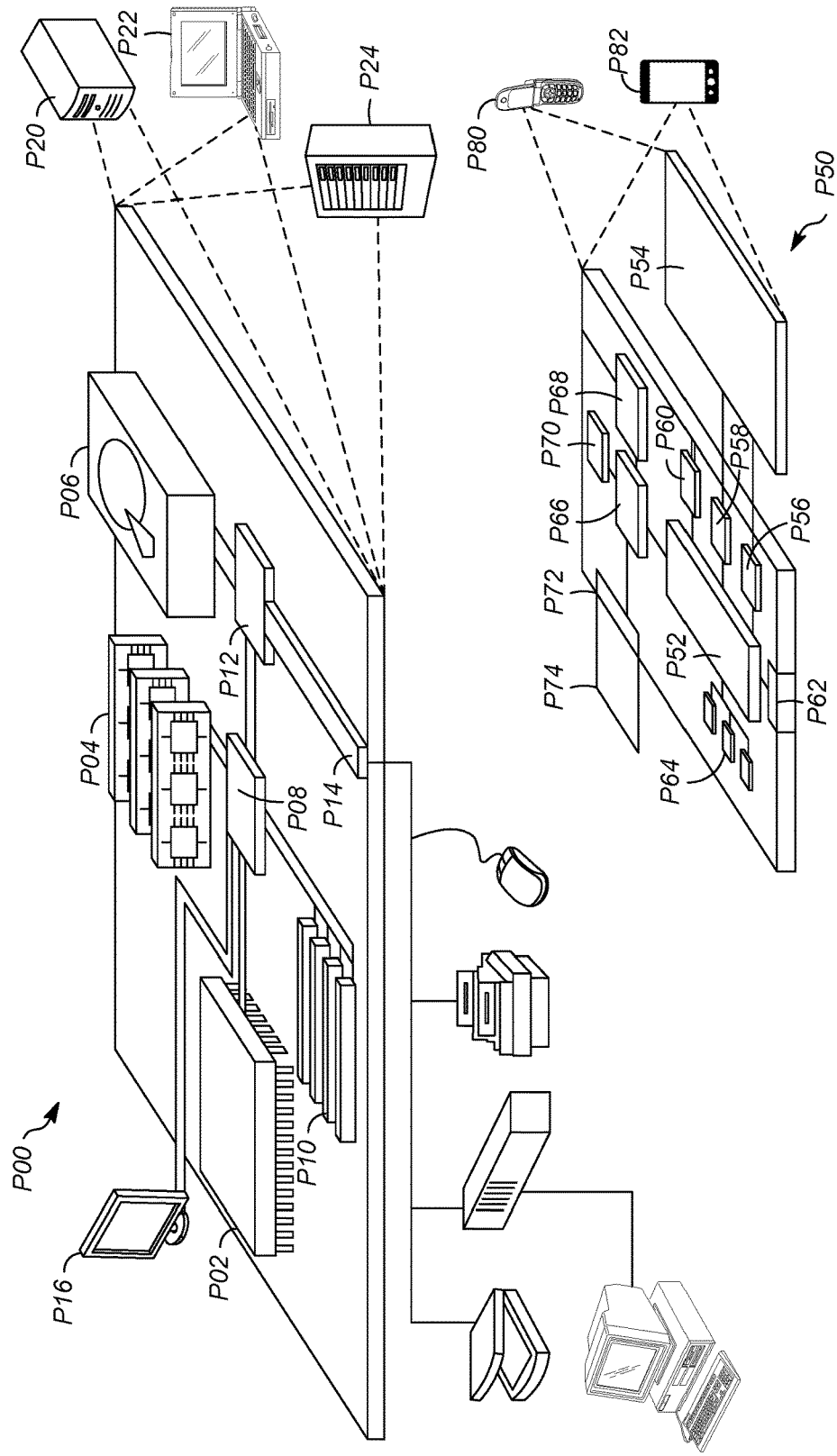
FIG. 8 is a block schematic diagram of an example computer device and an example mobile computer device that may be used to implement the examples disclosed herein.

The example VR system 100 may include any number of VR content systems 140 storing content and/or VR software modules in the form of VR applications (e.g., collision volume module 144 as shown in FIG. 3) that can generate, modify, and/or execute VR objects and scenes. In some examples, devices 110, 112 and 131-133 and the VR content system 140 include one or more processors and one or more memory devices, which can execute a client operating system and one or more client applications. In some implementations, the HMD 110, the controller 112, the other devices 131-133 or the VR content system 140 may be implemented by example computing devices (e.g., P00 and/or P50 of FIG. 8).

The VR applications (e.g., collision volume module 144) can be configured to execute on any or all of devices 110, 112 and 131-133. The HMD 110 can be connected to devices 131-133 to access VR content on VR content system 140, for example. Device 131-133 can be connected (wired or wirelessly) to HMD 110, which can provide VR content for display. A user's VR system can be HMD 110 alone, or a combination of device 131-133 and HMD 110.

In some implementations, the VR system 100 may include a motion sensing device and, under some circumstance, the user may be able to control a graphical representation in the VR environment 102 (and/or the user in the VR environment) in conjunction with the motion sensing device or the controller 112.

In some implementations, the VR system 100 may include a haptic based system or device. Such haptic based systems may provide the user with physical stimuli, such as mechanical feedback, corresponding at least in part to interactions between the graphical representation of the user, the VR environment 102, and/or objects depicted in the VR environment 102.

For example, the user may, within the VR environment 102, interact with an object (e.g., a virtual object). The object can be, or can include, any of a wide variety of objects at least some of which represent or correspond to real world objects. Such an interaction may involve a graphical representation of the user (or a portion thereof) interacting with a graphical representation of the object within the VR environment 102, for example.

In some implementations, the term computer-readable medium can include any type of tangible or non-transitory computer-readable medium and to expressly exclude propagating signals. Example computer-readable medium include, but are not limited to, a volatile and/or non-volatile memory, a volatile and/or non-volatile memory device, a compact disc (CD), a digital versatile disc (DVD), a read-only memory (ROM), a random-access memory (RAM), a programmable ROM (PROM), an electronically-programmable ROM (EPROM), an electronically-erasable PROM (EEPROM), an optical storage disk, an optical storage device, a magnetic storage disk, a magnetic storage device, a cache, and/or any other storage media in which information is stored for any duration (e.g., for extended time periods, permanently, brief instances, for temporarily buffering, and/or for caching of the information) and that can be accessed by a processor, a computer and/or other machine having a processor.

Referring to FIG. 9, an example of a generic computer device P00 and a generic mobile computer device P50, which may be used with the techniques described here. The computing devices P50 may be used to implement any of the devices disclosed herein including, but not limited to, HMD 110, controller, devices 126-128 and 130, HMD 215 and controller 220. Computing device P00 is intended to represent various forms of digital computers, such as laptops, desktops, tablets, workstations, personal digital assistants, televisions, servers, blade servers, mainframes, and other appropriate computing devices. Computing device P50 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device P00 includes a processor P02, memory P04, a storage device P06, a high-speed interface P08 connecting to memory P04 and high-speed expansion ports P10, and a low speed interface P12 connecting to low speed bus P14 and storage device P06. The processor P02 can be a semiconductor-based processor. The memory P04 can be a semiconductor-based memory. Each of the components P02, P04, P06, P08, P10, and P12, are interconnected using various busses, connections, memories, caches, etc. and may be mounted on a common motherboard or in other manners as appropriate. The processor P02 can process instructions for execution within the computing device P00, including instructions stored in the memory P04 or on the storage device P06 to light-emitting portion graphical information for a GUI on an external input/output device, such as light-emitting portion P16 coupled to high speed interface P08. In other implementations, multiple processors and/or multiple buses may be used, as appropriate, along with multiple memories and types of memory. Also, multiple computing devices P00 may be connected, with each device providing portions of the necessary operations (e.g., as a server bank, a group of blade servers, or a multi-processor system).

The memory P04 stores information within the computing device P00. In one implementation, the memory P04 is a volatile memory unit or units. In another implementation, the memory P04 is a non-volatile memory unit or units. The memory P04 may also be another form of computer-readable medium, such as a magnetic or optical disk.

The storage device P06 is capable of providing mass storage for the computing device P00. In one implementation, the storage device P06 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory P04, the storage device P06, or memory on processor P02.

The high speed controller P08 manages bandwidth-intensive operations for the computing device P00, while the low speed controller P12 manages lower bandwidth-intensive operations. Such allocation of functions is exemplary only. In one implementation, the high-speed controller P08 is coupled to memory P04, light-emitting portion P16 (e.g., through a graphics processor or accelerator), and to high-speed expansion ports P10, which may accept various expansion cards (not shown). In the implementation, low-speed controller P12 is coupled to storage device P06 and low-speed expansion port P14. The low-speed expansion port, which may include various communication ports (e.g., USB, Bluetooth, Ethernet, Wi-Fi) may be coupled to one or more input/output devices, such as a keyboard, a pointing device, a scanner, or a networking device such as a switch or router, e.g., through a network adapter.

The computing device P00 may be implemented in a number of different forms, as shown in the figure. For example, it may be implemented as a standard server P20, or multiple times in a group of such servers. It may also be implemented as part of a rack server system P24. In addition, it may be implemented in a personal computer such as a laptop computer P22. Alternatively, components from computing device P00 may be combined with other components in a mobile device (not shown), such as device P50. Each of such devices may contain one or more of computing device P00, P50, and an entire system may be made up of multiple computing devices P00, P50 communicating with each other.

Computing device P50 includes a processor P52, memory P64, an input/output device such as a light-emitting portion P54, a communication interface P66, and a transceiver P68, among other components. The device P50 may also be provided with a storage device, such as a microdrive or other device, to provide additional storage. Each of the components P50, P52, P64, P54, P66, and P68, are interconnected using various buses, and several of the components may be mounted on a common motherboard or in other manners as appropriate.

The processor P52 can execute instructions within the computing device P50, including instructions stored in the memory P64. The processor may be implemented as a chipset of chips that include separate and multiple analog and digital processors. The processor may provide, for example, for coordination of the other components of the device P50, such as control of user interfaces, applications run by device P50, and wireless communication by device P50.

Processor P52 may communicate with a user through control interface P58 and light-emitting portion interface P56 coupled to a light-emitting portion P54. The light-emitting portion P54 may be, for example, a TFT LCD (Thin-Film-Transistor Liquid Crystal Light-emitting portion) or an OLED (Organic Light-emitting Diode) light-emitting portion, or other appropriate light-emitting portion technology. The light-emitting portion interface P56 may comprise appropriate circuitry for driving the light-emitting portion P54 to present graphical and other information to a user. The control interface P58 may receive commands from a user and convert them for submission to the processor P52. In addition, an external interface P62 may be provided in communication with processor P52, so as to enable near area communication of device P50 with other devices. External interface P62 may provide, for example, for wired communication in some implementations, or for wireless communication in other implementations, and multiple interfaces may also be used.

The memory P64 stores information within the computing device P50. The memory P64 can be implemented as one or more of a computer-readable medium or media, a volatile memory unit or units, or a non-volatile memory unit or units. Expansion memory P74 may also be provided and connected to device P50 through expansion interface P72, which may include, for example, a SIMM (Single Inline Memory Module) card interface. Such expansion memory P74 may provide extra storage space for device P50, or may also store applications or other information for device P50. Specifically, expansion memory P74 may include instructions to carry out or supplement the processes described above, and may include secure information also. Thus, for example, expansion memory P74 may be provide as a security module for device P50, and may be programmed with instructions that permit secure use of device P50. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer or machine-readable medium, such as the memory P64, expansion memory P74, or memory on processor P5 that may be received, for example, over transceiver P68 or external interface P62.

Device P50 may communicate wirelessly through communication interface P66, which may include digital signal processing circuitry where necessary. Communication interface P66 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver P68. In addition, short-range communication may occur, such as using a Bluetooth, Wi-Fi, or other such transceiver (not shown). In addition, GPS (Global Positioning System) receiver module P70 may provide additional navigation- and location-related wireless data to device P50, which may be used as appropriate by applications running on device P50.

Device P50 may also communicate audibly using audio codec P60, which may receive spoken information from a user and convert it to usable digital information. Audio codec P60 may likewise generate audible sound for a user, such as through a speaker, e.g., in a handset of device P50. Such sound may include sound from voice telephone calls, may include recorded sound (e.g., voice messages, music files, etc.) and may also include sound generated by applications operating on device P50.

The computing device P50 may be implemented in a number of different forms, as shown in the figure. For example, it may be implemented as a cellular telephone P80. It may also be implemented as part of a smart phone P82, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the processing of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, the systems and techniques described here can be implemented on a computer having a light-emitting portion device (e.g., a CRT (cathode ray tube) or LCD (liquid crystal light-emitting portion) monitor) for light-emitting portioning information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

Terms such as, but not limited to, approximately, substantially, generally, etc. are used herein to indicate that a precise value or range thereof is not required and need not be specified. As used herein, the terms discussed above will have ready and instant meaning to one of ordinary skill in the art.

Moreover, use of terms such as up, down, top, bottom, side, end, front, back, etc. herein are used with reference to a currently considered or illustrated orientation. If they are considered with respect to another orientation, it should be understood that such terms must be correspondingly modified.

Further, in this specification and the appended claims, the singular forms "a," "an" and "the" do not exclude the plural reference unless the context clearly dictates otherwise. Moreover, conjunctions such as "and," "or," and "and/or" are inclusive unless the context clearly dictates otherwise. For example, "A and/or B" includes A alone, B alone, and A with B.

Additionally, connecting lines and connectors shown in the various figures presented are intended to represent exemplary functional relationships and/or physical or logical couplings between the various elements. It should be noted that many alternative and/or additional functional relationships, physical connections or logical connections may be present. Moreover, no item or component is essential to the practice of this disclosure unless the element is specifically described as "essential" or "critical". Additionally, the figures and/or drawings are not drawn to scale, but rather are drawn for clarity of illustration and description.

Although certain example methods, apparatuses and articles of manufacture have been described herein, the scope of coverage of this patent is not limited thereto. It is to be understood that terminology employed herein is for the purpose of describing particular aspects, and is not intended to be limiting. On the contrary, this patent covers all methods, apparatus and articles of manufacture fairly falling within the scope of the claims of this patent.

What is claimed:

1. A method comprising:
    determining, via a controller, a first position of a user in a virtual reality (VR) environment;
    determining a position of each of a plurality of objects in the VR environment;
    defining a first vector between the first position of the user and the position of each of the plurality of objects;
    defining a plurality of elongated collision volumes with each of the plurality of elongated collision volumes being aligned along the respective first vectors associated with the plurality of objects, each of the plurality of elongated collision volumes has a medial portion around at least a portion of a respective object from the plurality of objects, a proximal portion disposed closest to the first position of the user, and a distal portion disposed farthest from the first position of the user, wherein a cross-sectional area of the proximal portion is less than a cross-sectional area of the distal portion;
    detecting a change of the user from the first position to a second position;
    defining a second vector between the second position of the user and the position of each of the plurality of objects;

aligning the plurality of elongated collision volumes along the respective second vectors based on the second position of the user such that a portion of one elongated collision volume overlaps with a portion of another elongated collision volume; and detecting an interaction of the user with at least one of the plurality of elongated collision volumes.

2. The method of claim 1, further comprising:

determining that the position of at least one of the plurality of objects is outside of a threshold reach of the user, wherein the defining the plurality of elongated collision volumes is in response to when the at least one of the plurality of objects being outside of the threshold reach of the user.

3. The method of claim 1, wherein the at least one of the plurality of elongated collision volumes has a trapezoidal shape.

4. The method of claim 1, wherein the at least one of the plurality of elongated collision volumes has a trapezoidal shape along a first side and a trapezoidal shape along a second side.

5. The method of claim 1, wherein at least one of a volume of the distal portion of the at least one of the plurality of elongated collision volumes or a volume of the proximal portion of the at least one of the plurality of elongated collusion volumes is greater than a volume of the medial portion of the at least one of the plurality of elongated collision volumes.

6. The method of claim 1, wherein a volume of the distal portion of the at least one of the plurality of elongated collision volumes is greater than a volume of the proximal portion of the at least one of the plurality of elongated collision volumes.

7. A method comprising:

determining, via a controller, a position of a user in an environment;

identifying a plurality of collision volumes, each collision volume from the plurality of collision volumes being associated with a respective virtual object from a plurality of virtual objects;

modifying each of the plurality of collision volumes along a direction between the respective virtual object of the plurality of virtual objects and the position of the user to define a plurality of modified collision volumes;

detecting a change in position of the user, wherein during the detected change in position of the user, a portion of one modified collision volume is re-aligned, and based on the re-alignment, overlaps with a portion of another modified collision volume; and detecting an interaction by the user with at least one of the plurality of modified collision volumes.

8. The method of claim 7, wherein the modifying includes elongating each of the plurality of modified collision volumes at least one of toward or away from the position of the user.

9. The method of claim 7, wherein each of the plurality of modified collision volumes rotates in response to the change in position of the user.

10. The method of claim 7, wherein each of the plurality of modified collision volumes is in a shape of at least one of a cube, rectangular-cube, sphere, tetrahedron or a polyhedron.

11. The method of claim 7, wherein the at least one of the plurality of modified collision volumes has similar shape as one of the plurality of virtual objects.

12. The method of claim 7, wherein the at least one of the plurality of modified collision volumes has a trapezoidal shape, in which an end of the trapezoidal shape farthest to the position of the user is larger than an end of the trapezoidal shape closest to the position of the user.

13. The method of claim 7, further comprising:

determining whether at least one of the plurality of virtual objects is outside of a threshold reach of the user, wherein the at least one of the plurality of modified collision volumes is identified when the at least one of the plurality of virtual objects is outside of the threshold reach of the user.

14. An apparatus comprising:

a sensor configured to determine a position of a user within an environment; and a processor programmed to:

determine a position of a plurality of virtual objects;

identify a plurality of collision volumes associated with the plurality of virtual objects, each of the plurality of collision volumes being associated with a respective virtual object from the plurality of virtual objects;

modify each of the plurality of collision volumes along a direction between the respective virtual object from the plurality of virtual objects and the position of the user to define a plurality of modified collision volumes;

detect a change in position of the user, wherein during the detected change in position of the user, a portion of one modified collision volume is re-aligned, and based on the re-alignment, overlaps with a portion of another modified collision volume; and detect an interaction of the user with at least one of the plurality of modified collision volumes.

15. The apparatus of claim 14, wherein the processor is further programmed to elongate the at least one of the plurality of modified collision volumes associated with at least one of the plurality of virtual objects at least one of toward or away from the position of the user.

16. The apparatus of claim 14, wherein the processor is further programmed to rotate the at least one of the plurality of modified collision volumes associated with at least one of the plurality of virtual objects in response to the change in position of the user.

17. The apparatus of claim 14, wherein the processor is further programmed to determine whether at least one of the plurality of virtual objects is outside of a threshold reach of the user, and identify the at least one of the plurality of modified collision volumes when the at least one of the plurality of virtual objects is outside of the threshold reach of the user.

18. A non-transitory machine-readable medium storing machine-readable instructions that, when executed, cause a machine to at least perform the method of claim 1.

* * * * *